3,271,993
ACCURATE FLOW CONTROL
Bobbie L. Whitson, Bartlesville, Okla., assignor to Phillips Petroleum Company, a corporation of Delaware
Filed Dec. 9, 1963, Ser. No. 328,911
3 Claims. (Cl. 73—3)

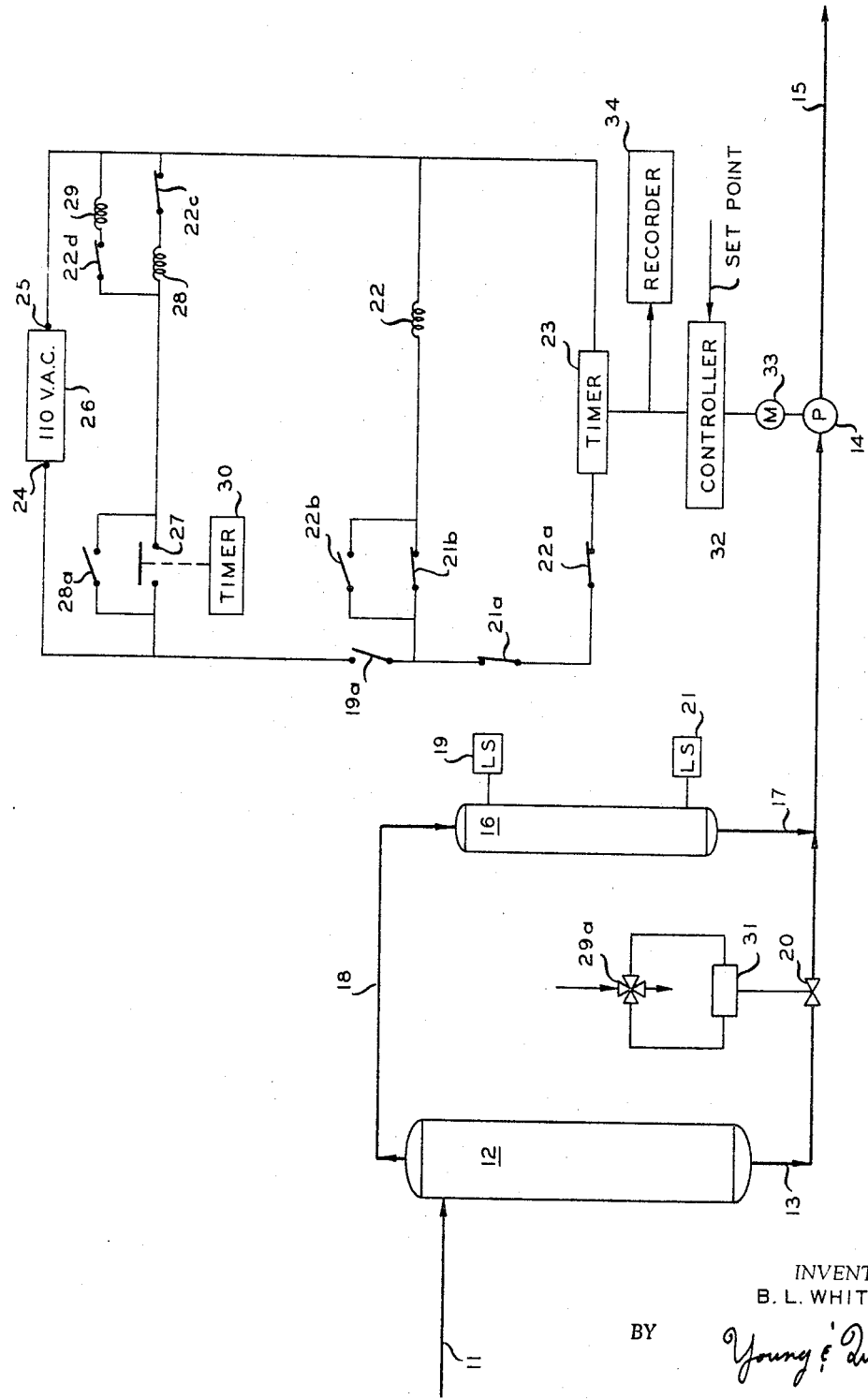

The invention relates to method and apparatus for calibrating a flow controller.

In many processes it is desirable or necessary to maintain a greater accuracy in the regulation of the flow rate of a fluid stream than is generally provided by conventional flow controllers. It has been proposed that the flow controllers be periodically calibrated. However many of the proposed calibration schemes required taking the flow controller off-stream or resulted in a disturbance or undesirable variation in the flow rate of the fluid stream.

In accordance with the present invention there is provided method and apparatus for periodically calibrating a flow controller without the necessity of taking the flow controller off-stream or creating undesirable variations in the flow rate of the stream. A storage tank is maintained in fluid communication with the fluid stream upstream of the flow controller under conditions such that fluid from the stream will fill the tank to at least a predetermined level. When it is desired to calibrate the flow controller, a valve in the fluid stream upstream of the storage tank is closed whereby the storage tank becomes the feed source for the flow controller. Liquid level sensors and timing means are utilized to determine the time required for a predetermined volume of fluid to be withdrawn from the storage tank. When the liquid level in the storage tank drops below a predetermined point, the upstream valve is actuated to an open position to refill the storage tank and provide a continuous supply of feed to the flow controller. The output of the timer can be utilized to adjust the flow controller to provide the desired flow rate.

Accordingly it is an object of the invention to provide improved method and means for calibrating a flow controller. Another object of the invention is to provide accurate control of the flow rate of a fluid stream. It is an object of the invention to calibrate a flow controller without taking the flow controller off-stream. It is a further object of the invention to calibrate a flow controller without causing undesirable fluctuations in the flow rate of the stream being controlled.

Other aspects, objects and advantages of the invention will become apparent from a study of the disclosure, the drawing and the appended claims to the invention.

Referring now to the drawing, wherein there is presented a diagrammatic representation of a flow controller calibration system in accordance with the invention, a liquid material is passed through line 11 into surge tank 12. Liquid is withdrawn from tank 12 and passed by way of conduit or line 13 to the inlet of metering pump 14. The outlet of pump 14 is connected to line 15 to pass the liquid to points of further processing. The lower portion of calibration tank 16 is connected by way of line 17 to line 13 while an upper portion of tank 16 is connected by way of line 18 to an upper portion of tank 12. Where tank 12 is at or near atmospheric pressure, conduit 18 can be utilized to connect the upper portion of tank 16 to an atmospheric vent instead of the upper portion of tank 12. Tank 16 is provided with an upper liquid level sensor 19 and a lower liquid level sensor 21. The position of tank 16 with respect to tank 12 is such that tank 16 will fill with liquid to a point higher than the location of upper liquid level sensor 19 when liquid communication is present between tanks 12 and 16. Valve 20 is located in line 13 upstream of line 17 to establish or discontinue such liquid communication.

Switches 19a, 21a and 22a are connected in series with timer 23 between first and second terminals 24 and 25 of 110 v. A.C. source 26. Switch 21b and relay coil 22 are connected in series between terminal 25 and the junction between switches 19a and 21a. Switch 22b is connected in parallel with switch 21b. Switch 27, relay coil 28 and switch 22c are connected in series between terminals 24 and 25. Switch 28a is connected in parallel with switch 27. Switch 22d and relay coil 29 are connected in series between terminal 25 and the junction between switch 27 and relay coil 28. Switch 19a is actuated by upper liquid level sensor 19 while switches 21a and 21b are actuated by lower liquid level sensor 21. Switches 22a, 22b, 22c and 22d are actuated by relay coil 22 while switch 28a is actuated by relay coil 28. Switches 21a, 22a, 22c and 22d are normally closed switches, and switches 19a, 21b, 22b and 28a are normally opened switches. Relay 29 actuates solenoid control valve 29a. Valve 29a is a three way valve having an air supply connected to the inlet. Two of the outlets of valve 29a are connected to diaphragm valve motor 31 while the remaining outlet of valve 29a is connected to vent. Motor 31 actuates valve 20 between on and off positions.

Timer 23 can be provided with peak holding means for producing an output representative of the maximum value registered by timer 23 during the last operation thereof. The maximum peak output of timer 23 can be applied to the signal input of controller 32. A signal representative of the desired value of flow rate in line 15 can be applied to the set point input of controller 32. The output of controller 32, which is responsive to the difference between the set point signal and the output of timer 23, is applied to motor 33 to regulate the speed thereof, and thus control the pumping rate of pump 14 to provide the desired flow rate in line 15. The output of timer 23 can be applied to an input of recorder 34.

When it is desired to calibrate pump 14, switch 27 is closed either manually or by suitable timing means 30. The closing of switch 27, which is a momentary type switch, energizes relay coil 28 which then closes switch 28a to maintain the circuit when switch 27 is released or opened, and also energizes relay coil 29. The actuation of relay coil 29 manipulates solenoid control valve 29a to vent air from the under side of the diaphragm or piston in pneumatic valve motor 31 and at the same time apply air to the top side of the diaphragm or piston, thus closing valve 20. Upon the closing of valve 20, pump 14 takes feed from tank 16. When the liquid level in tank 16 reaches upper liquid level sensor 19, sensor 19 closes switch 19a to actuate timer 23. When the level reaches lower liquid level sensor 21, sensor 21 will open switch 21a, thus stopping timer 23, and close switch 21b, thus actuating relay coil 22. Relay coil 22 closes switch 22b and opens switches 22a, 22c, and 22d. The opening of switch 22c causes the deactuation of relay coil 28, thus opening switch 28a. The opening of switch 22d deenergizes relay coil 29 and thus manipulates valve 29a to apply air to the under side and to vent the upper side of the piston or diaphragm in pneumatic valve motor 31, causing valve 20 to open. Conduit 17 and tank 16 are provided with sufficient volume below lower liquid level sensor 21 to supply pump 14 until valve 20 is opened, thus avoiding any undesirable drop in flow rate. Valve 20 in its open position permits flow rate of liquid sufficient to meet the requirements of pump 14 and to refill tank 16, again avoiding any undesirable disturbances in the output of pump 14.

As the liquid level in tank 16 rises to lower liquid level sensor 21, switch 21a is closed and switch 21b is opened. Switch 22a, being open, prevents any actuation of timer 23. Switch 22b maintains current flow through relay coil 22. When the liquid level in tank 16 rises to upper liquid level sensor 19, switch 19a is opened to deactuate relay coil 22, thus opening switch 22b and permitting switches 22a, 22c and 22d to close. The system is then ready to repeat the cycle when desired.

While the flow controller has been illustrated as a metering pump 14, the invention is applicable to any flow controller known in the art, for example, a flow rate controller which manipulates a valve responsive to the difference between measured flow as determined by an orifice flow meter and the output of timer 23 or controller 32. It is within the contemplation of the invention to directly record the time output of timer 23 or to record the output of the peak holder, and to utilize such output to adjust motor 33 or the set point input to a flow rate controller. While valve 20 has been described as a pneumatic actuated valve, any suitable valve can be utilized, for example, a solenoid valve.

Reasonable variation and modification are possible within the scope of the foregoing disclosure, the drawing and the appended claims to the invention.

I claim:

1. Apparatus for calibrating a flow controller comprising in combination a storage tank; a conduit connected to a lower portion of said storage tank for passing liquid from said storage tank; a flow controller operatively positioned in said conduit; a valve operatively positioned in said conduit upstream of said flow controller; a calibration tank; an upper liquid level sensor and a lower liquid level sensor operatively positioned on said calibration tank in a vertically spaced apart relationship; means for connecting the lower portion of said calibration tank to said conduit at a point upstream of said flow controller and downstream of said valve in such a manner that said calibration tank is at least partially filled with liquid to a point above said upper liquid level sensor when said valve is opened and liquid drains from said calibration tank into said conduit when said valve is closed; a voltage source having first and second terminals; first, second and third switches and a timer connected in series between said first and second terminals; a fourth switch and a relay coil connected in series between said second terminal and the junction between said first and second switches; a fifth switch connected in parallel with said fourth switch; a sixth switch, a second relay coil and a seventh switch connected in series between said first and second terminals; an eighth switch connected in parallel with said sixth switch; a ninth switch and a third relay coil connected in series between said second terminal and the junction between said sixth switch and said second relay coil; said first switch being actuated by said upper liquid level sensor to an open position when the liquid level in said calibration tank is above said upper liquid level sensor and to a closed position when the liquid level in said calibration tank is below said upper liquid level sensor; said second switch being actuated by said lower liquid level sensor to a closed position when the liquid level in said calibration tank is above said lower liquid level sensor and to an open position when the liquid level is below said lower liquid level sensor; said fourth switch being actuated by said lower liquid level sensor to an open position when the liquid level in said calibration tank is above said lower liquid level sensor and to a closed position when said liquid level is below said lower liquid level sensor; said third, seventh and ninth switches being normally closed switches which are actuated to open positions upon the passage of current through said first relay coil; said fifth switch being a normally open switch which is actuated to a closed position upon the passage of current through said first relay coil; said eighth switch being a normally open switch which is actuated to a closed position upon the passage of current through said second relay coil; and means for actuating said valve to a closed position responsive to the passage of current through said third relay coil; the output of said timer being representative of the time required for the liquid level in said calibration tank to drop from a first predetermined level as determined by said upper liquid level sensor to a second predetermined level as determined by said lower liquid level sensor during the time said valve is closed.

2. Apparatus in accordance with claim 1 further comprising means responsive to the output of said timer for adjusting said flow controller to maintain the flow rate through said flow controller substantially constant.

3. Apparatus in accordance with claim 2 wherein said flow controller comprises a metering pump and a motor for driving said pump; and wherein said means for adjusting said flow controller comprises means for varying the speed of said motor responsive to the output of said timer.

References Cited by the Examiner

UNITED STATES PATENTS

| | | | |
|---|---|---|---|
| 2,392,951 | 1/1946 | Salisbury | 73—168 X |
| 2,826,067 | 3/1958 | Braunlich | 73—168 |

LOUIS R. PRINCE, *Primary Examiner.*

S. C. SWISHER, *Assistant Examiner.*